US011826937B2

(12) United States Patent
Heyer et al.

(10) Patent No.: US 11,826,937 B2
(45) Date of Patent: Nov. 28, 2023

(54) NONRETURN VALVE FOR THE SCREW OF A PLASTICISING UNIT OF AN INJECTION-MOULDING MACHINE

(71) Applicant: KRAUSSMAFFEI TECHNOLOGIES GMBH, Munich (DE)

(72) Inventors: Norbert Heyer, Munich (DE); Thomas Hungerkamp, Munich (DE)

(73) Assignee: KRAUSSMAFFEI TECHNOLOGIES GMBH, Munich (DE)

( * ) Notice: Subject to any disclaimer, the term of this patent is extended or adjusted under 35 U.S.C. 154(b) by 0 days.

(21) Appl. No.: 17/049,444

(22) PCT Filed: Apr. 17, 2019

(86) PCT No.: PCT/EP2019/059966
§ 371 (c)(1),
(2) Date: Oct. 21, 2020

(87) PCT Pub. No.: WO2019/214919
PCT Pub. Date: Nov. 14, 2019

(65) Prior Publication Data

US 2021/0053264 A1 Feb. 25, 2021

(30) Foreign Application Priority Data

May 8, 2018 (DE) ..................... 10 2018 111 055.3

(51) Int. Cl.
*B29C 45/52* (2006.01)
*B29C 45/60* (2006.01)

(52) U.S. Cl.
CPC .............. *B29C 45/52* (2013.01); *B29C 45/60* (2013.01); *B29C 2045/528* (2013.01)

(58) Field of Classification Search
CPC .......................... B29C 45/52; B29C 2045/528
See application file for complete search history.

(56) References Cited

U.S. PATENT DOCUMENTS 3,335,461 A * 8/1967 Schwartz .............. B29C 48/363 222/404
3,438,393 A * 4/1969 Godley ................... B29C 45/52 137/533.17

(Continued)

FOREIGN PATENT DOCUMENTS

DE 11 24 672 B 3/1962
DE 12 60 765 B 2/1968

(Continued)

OTHER PUBLICATIONS

Machine translation DE29503275U1 (Year: 1995).*

(Continued)

*Primary Examiner* — Matthew J Daniels
*Assistant Examiner* — Wayne K. Swier
(74) *Attorney, Agent, or Firm* — Pearne & Gordon LLP

(57) ABSTRACT

A nonreturn valve includes two half-shells, arranged in a portion of the screw with a reduced screw diameter. One or more channels for the melt to flow through from the screw into the space in front of the screw is/are provided in each of the half-shells, the channels lie substantially parallel to the longitudinal axis of the nonreturn valve or of the screw. In each of the channels are a ball and, following the ball in the direction of flow of the melt, a pin arranged substantially transversely to the direction of flow of the melt. In the direction of flow of the melt, the channels have a first channel portion, with a channel diameter less than the diameter of the ball, and a second channel portion, with a channel diameter greater than the diameter of the ball, the ball and the pin are arranged in the second channel portion.

11 Claims, 3 Drawing Sheets

(56) References Cited

U.S. PATENT DOCUMENTS 3,452,398 A 7/1969 Siegel
3,689,184 A 9/1972 Morse
4,377,180 A * 3/1983 Biljes ...................... B29C 45/52 137/528
4,988,281 A * 1/1991 Heathe .................... B29C 45/52 366/77
5,112,213 A * 5/1992 Oas ......................... B29C 45/52 366/79
5,151,282 A * 9/1992 Dray ....................... B29C 45/50 425/562
5,975,130 A * 11/1999 Ligh ....................... F16K 15/04 137/519
6,332,347 B1 11/2001 Xu
6,499,987 B1 * 12/2002 Durina .................... B29C 45/52 425/192 R
7,172,333 B2 * 2/2007 Anderson ........... B29C 44/3442 366/82
7,654,809 B2 2/2010 Takatsugi et al.
2004/0013763 A1 * 1/2004 Schimmel ............... B29C 45/52 425/564
2004/0213076 A1 * 10/2004 Albrecht ................. B29C 45/53 366/78
2007/0269550 A1 * 11/2007 Manda .................... B29C 45/52 425/557

FOREIGN PATENT DOCUMENTS

DE 12 66 486 B 4/1968
DE 15 54 762 A1 1/1970
DE 295 03 275 U1 5/1995
DE 29503275 U1 * 5/1995 ............. B29C 45/52
GB 911498 B * 11/1962 ............. B29C 45/52
GB 1066206 A * 4/1967 ............. B29C 45/52
GB 1066206 A 4/1967
JP H05-60824 U 8/1993

OTHER PUBLICATIONS

International Search Report for PCT/EP2019/059966 dated Aug. 14, 2019.

International Preliminary Report on Patentability dated Nov. 14, 2019.

* cited by examiner

Prior Art

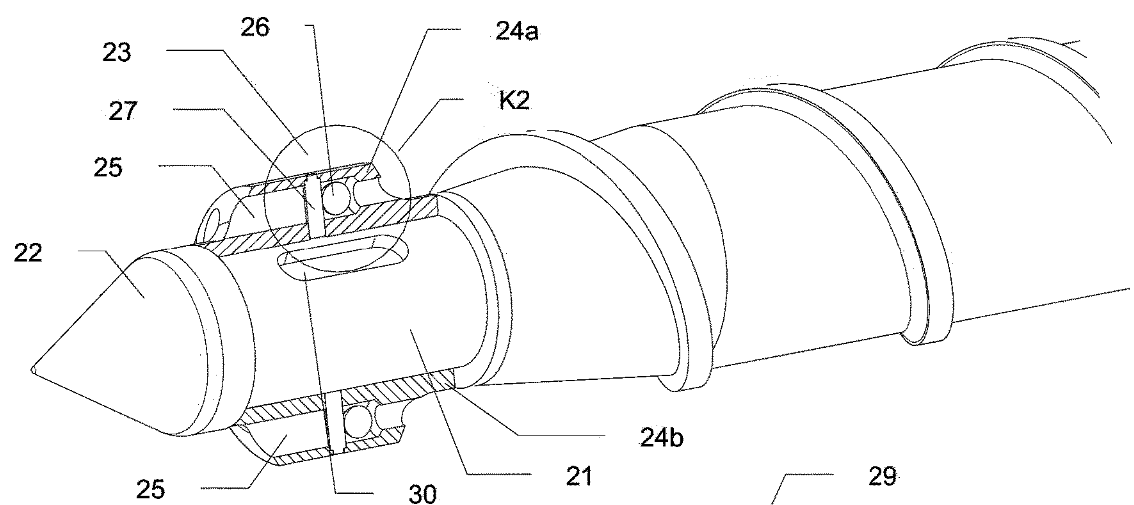
Fig. 3a
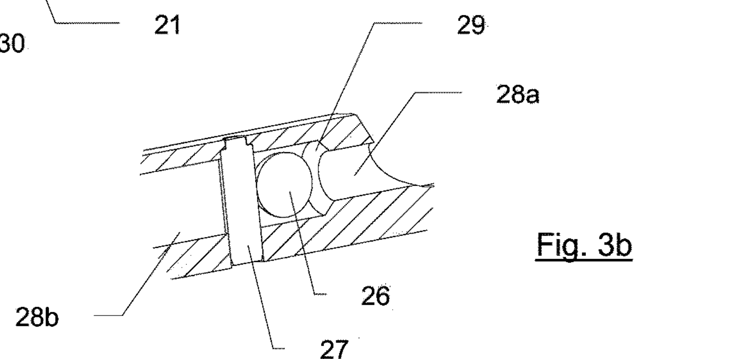
Fig. 3b
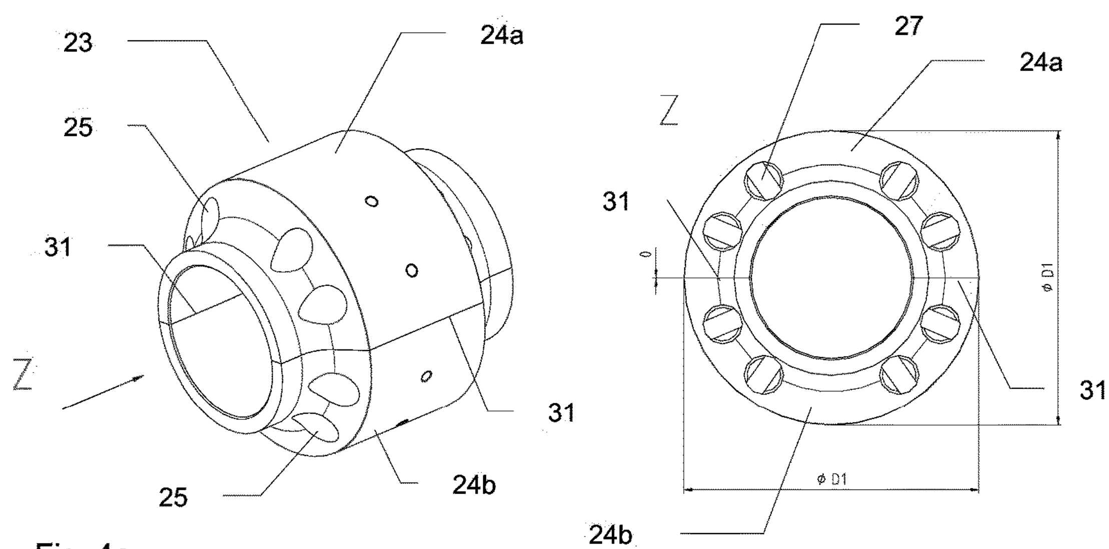
Fig. 4a
Fig. 4b

NONRETURN VALVE FOR THE SCREW OF A PLASTICISING UNIT OF AN INJECTION-MOULDING MACHINE

CROSS-REFERENCE TO RELATED APPLICATIONS

This is a National Stage application of PCT international application PCT/EP2019/059966 filed on Apr. 17, 2019, which claims the priority of European Patent Application No. 10 2018 111 055.3, filed May 8, 2018, which are incorporated herein by reference in their entireties.

BACKGROUND OF THE INVENTION

In the injection moulding of thermoplastic plastics, screws are used which are axially displaceable in screw cylinders and are rotatable in a defined direction. In the plasticising process the screw rotates and is displaced toward the rear by the plastic which is conveyed into the space in front of the screw. The plastic granulate is melted by the friction which is occurring here in the plastic, and by heating bands which are additionally arranged externally on the screw cylinder. For the injecting of the molten plastic mass into the cavity of a moulding tool, the screw is used as a piston and for this purpose is moved axially in the screw cylinder. In order to prevent molten plastic from flowing back during this injection process, therefore during the forward movement of the non-rotating screw, nonreturn valves are used. During the plasticising process, a torque acts, during the injection process an axial force on the screw. FIG. 1*a* shows such a known plasticising unit. It comprises substantially a screw cylinder 1 with a cylinder head 2, a screw 3, heating bands 4 and a granulate hopper 5. In FIG. 1*b* the portion of the plasticising unit which is situated in the circle K1 is illustrated on an enlarged scale and it can be seen that a nonreturn valve 6 is present at the front end of the screw 3.

FIG. 2 shows a screw with a nonreturn valve according to the prior art. Usually, three-part nonreturn valves consisting of a stationary screw head 7 and pressure rung 8 and of a displaceable blocking ring 9 are used. The screw head 7 is usually connected by a thread 10 with the screw 3. The screw head 7 has one or more wings 11. During the plasticising process, the blocking ring 9 lies against the wings 11 of the screw head 7, wherein the melt can flow from the screw 3 into the space in front of the screw. During the injection process, the blocking ring 9 lies against the pressure ring 8, whereby a flowing back of the plastic mass into the screw 3 is prevented.

A disadvantage is such a known nonreturn valve is the connection of screw head and screw with a thread, because this brings about a cross-section weakening of the screw. This leads to a reduction of the component stability and the lifespan.

BRIEF SUMMARY OF THE INVENTION

Proceeding herefrom, the invention is based on the problem of indicating a nonreturn valve which enables the transfer of greater axial forces and torques onto the screw, and brings about an extending of the lifespan of the screw.

The solution to this problem takes place through a nonreturn valve having the features of claim 1. Advantageous embodiments and further developments are to be found in the dependent claims.

Through the fact two half-shells can be arranged in a portion of the screw with a reduced screw diameter, the screw and the screw tip can be embodied as one component. Thereby, the cross-section weakening of the screw, known from the prior art, is prevented. The function of the nonreturn valve is incorporated into the two half-shells. For this purpose, in each of the half-shells one or more channels are provided for the melt to flow through from the screw into the space in front of the screw, wherein the channels lie substantially parallel to the longitudinal axis of the nonreturn valve or respectively to the longitudinal axis of the screw. Provided in each of the channels are a ball and, following the ball as seen in the direction of flow of the melt, a pin, wherein the pin is arranged substantially transversely to the direction of flow of the melt. As seen in the direction of flow of the melt, the channels each have a first channel portion, with a channel diameter less than the diameter of the ball, and a second channel portion with a channel diameter greater than the diameter of the ball, wherein the ball and the pin are arranged in the second channel portion. According to a core idea of the invention, the function of a nonreturn valve is transferred into a component added to the screw, namely in two half-shells, which are mounted onto the screw around the screw. For this purpose, the diameter of the screw is reduced in a suitable manner over a portion corresponding to the longitudinal extent of the two half-shells.

According to an advantageous embodiment, a conically configured transition can be provided from the first channel portion to the second channel portion, so that a conical sealing seat is produced for the ball.

Furthermore, the pin can preferably be configured as a cylinder pin and can therefore have a cylindrical cross-section.

According to a further preferred embodiment, the half-shells can be configured in such a way that the external diameter of the joined-together half-shells measured parallel and perpendicularly to the separation joint is of equal size, in such a way that in the joined-together state a separation gap width of zero is produced.

A further core idea of the present invention concerns a screw of a plasticising unit, which screw is equipped with a nonreturn valve according to the invention. Here, the screw has a portion in which no screw flight is present, and in which the external diameter of the screw corresponds to the internal diameter of the nonreturn valve. The two half-shells of a nonreturn valve according to the invention are arranged in said portion on the screw.

In an embodiment, provision can be made that the nonreturn valve, as seen in the direction of flow of the melt, is arranged at the front end of the screw. In contrast to the prior art, the screw tip and the screw can be formed as one component or respectively in one piece.

According to another embodiment, provision can be made that the nonreturn valve is arranged spaced apart from the front end of the screw, in such a way that as seen in the direction of flow of the melt, a screw portion with a screw flight is present both in front of and also behind the nonreturn valve.

In an advantageous manner, one of the two half-shells, or both half-shells, can be arranged on the screw by means of an anti-rotation means. Here, the anti-rotation means can be embodied in the form of one or more keys, wherein suitable keyways are provided in the screw and in one or both half-shells.

BRIEF DESCRIPTION OF THE DRAWINGS

The invention is to be described in further detail below with the aid of an example embodiment and with reference to the Figures. There are shown:

FIG. 3*a* perspective illustration of a screw according to a first embodiment with a nonreturn valve according to the invention—with sectional illustration in the region of the nonreturn valve;

FIG. 3*b* enlarged illustration of the part of the nonreturn valve of FIG. 3*a*, situated in the circle K2;

FIG. 4*a* perspective illustration of a nonreturn valve according to the invention;

FIG. 4*b* top view onto the nonreturn valve according to FIG. 4*a* from the direction of the arrow Z in FIG. 4*a;*

DESCRIPTION OF EXAMPLE EMBODIMENTS

Figure 1A:
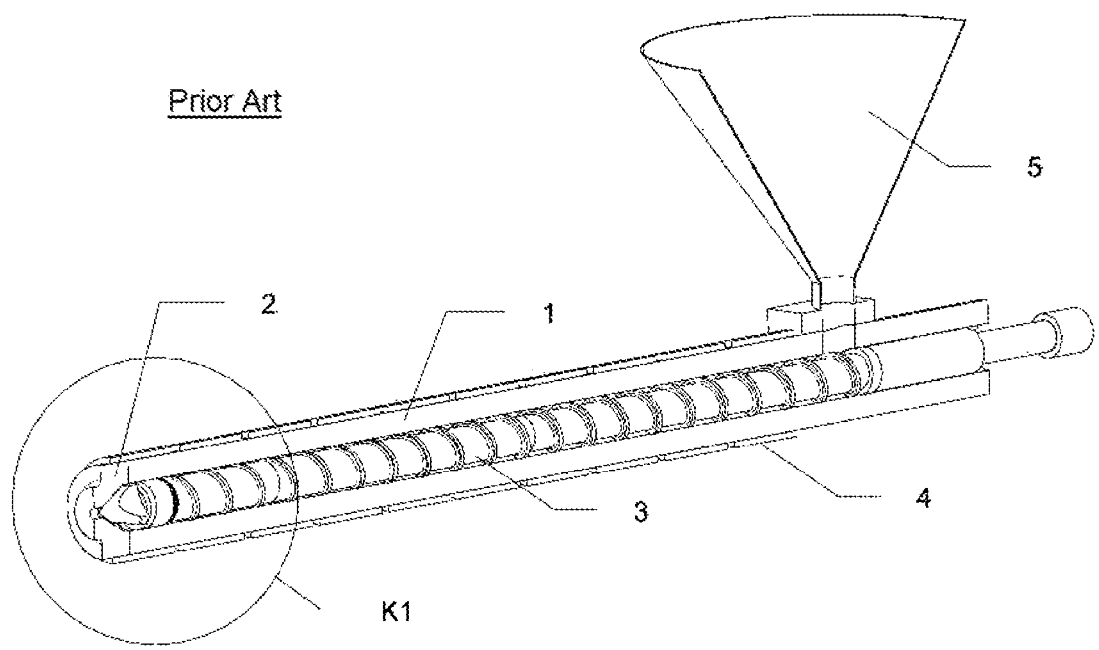
FIG. 1*a* illustration of a known plasticising unit.

According to FIG. 3*a*, a screw 20 is configured at its front end with a portion 21 of reduced screw diameter. A screw tip 22 adjoins thereto downstream. In the portion 21, a nonreturn valve 23 according to the invention is arranged, comprising two half-shells 24*a* and 24*b*. In each of the half-shells 24*a*, 24*b* channels 25 are provided for the melt to flow through from the screw 20 into the space in front of the screw in front of the screw tip 22. The channels lie parallel to the longitudinal axis of the nonreturn valve 23 or respectively to the longitudinal axis of the screw 20. In each of the channels 25 there are provided a ball 26 and, following the ball 26 as seen in the direction of flow of the melt, a pin 27, wherein the pin is preferably arranged substantially transversely to the direction of flow of the melt. The channels 25 are configured in such a way that, as seen in the direction of flow of the melt, respectively a first channel portion 28*a* is present having a channel diameter which is smaller than the ball diameter, and a second channel portion 28*b* is present having a channel diameter which is greater than the ball diameter. The ball and pin are arranged in the second channel portion 28*b*. The transition 29 from the first channel portion 28*a* to the second channel portion 28*b* is preferably configured conically, from which a conical sealing seat results for the ball 26. An anti-rotation means 30 ensures that on rotation of the screw 20 no relative movement can occur between the screw and the nonreturn valve. The anti-rotation means 30 can be embodied in the form of one or more keys (not illustrated here). The anti-rotation means can, however, also take place in another suitable manner in a form-fitting manner. The half-shells 24*a*, 24*b*, the balls 25 and the pins 27 preferably consist of hardened, wear-resistant steel. The outer surface of the half-shells, in particular the external diameter of the half-shells 24*a* and 24*b*, can be additionally protected by a wear protection layer. This can be applied for example by plasma powder deposition welding. In contrast to the prior art, the screw tip 22 and the screw 20 are one component.

As can be seen in FIGS. 4*a* and 4*b*, the half-shells 24*a* and 24*b* are preferably embodiment so that in the separation joint 31 between the two half-shells a separation gap of '0' results. The external diameter of the mounted half-shells 24*a* and 24*b*, measured parallel and perpendicularly to the separation joint 31, is of equal size. Through this embodiment, a flowing back of the molten plastic between the two half-shells 24*a* and 24*b* is prevented.

Figure 1B:
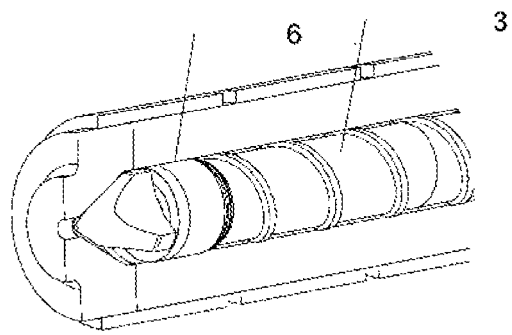
FIG. 1*b* illustration of an enlarged portion of the plasticising unit in the circle K1 of FIG. 1*a;*
Figure 2:
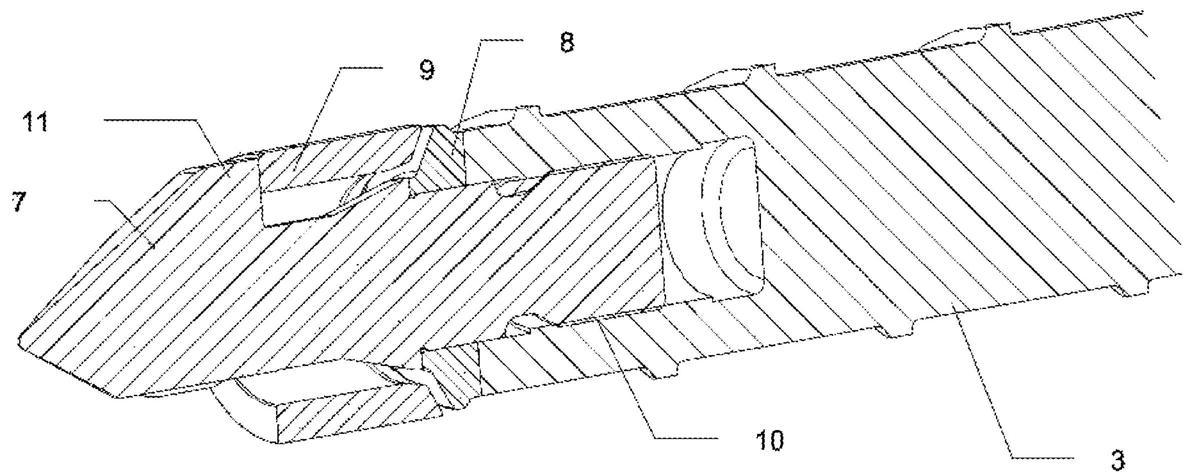
FIG. 2 illustration of a screw with a nonreturn valve according to the prior art.
Figure 5A:
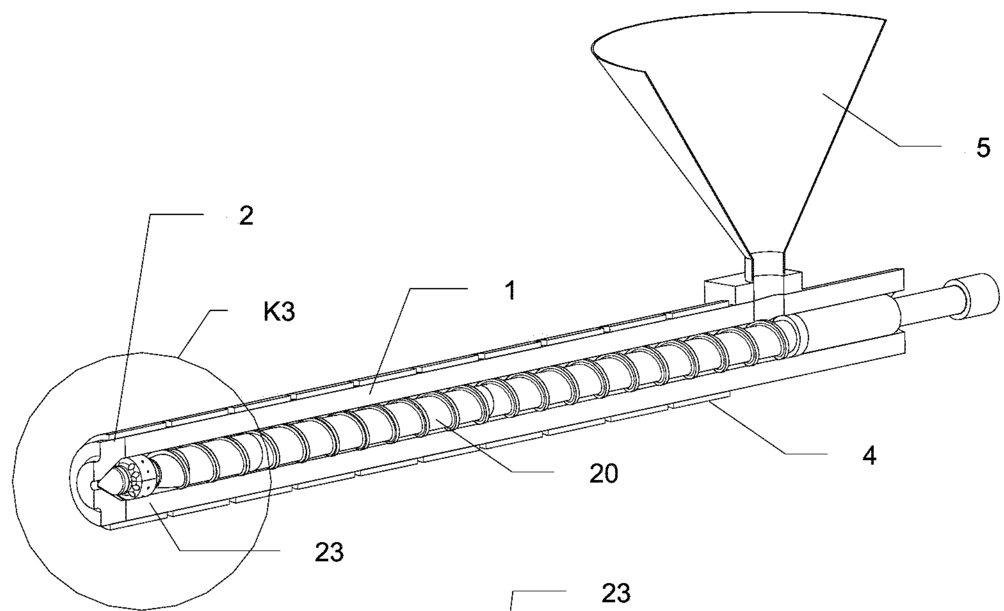
FIG. 5*a* perspective illustration of a plasticising unit with a nonreturn valve according to the invention—with cut open cylinder and granulate hopper.
Figure 5B:
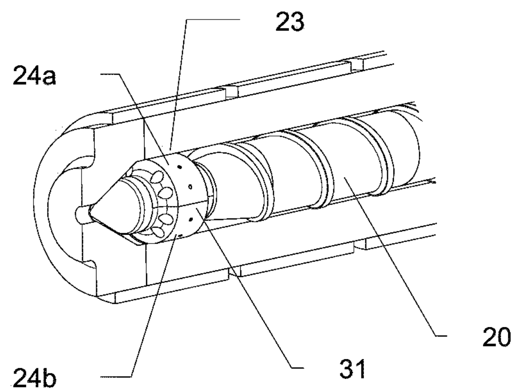
FIG. 5*b* enlarged illustration of the part of the plasticising unit of FIG. 5*a*, situated in the circle K3.

FIGS. 5*a* and 5*b* show a plasticising unit with a screw according to a first embodiment of the invention. Screw cylinder 1, cylinder head 2, heating bands 4 and granulate hopper 5 can be configured in a manner known per se as in FIG. 1. Therefore, the same reference numbers can also be used here. In contrast to the prior art, the screw 20 is equipped with a nonreturn valve 23 according to the invention. The front end of the screw 20 is configured in accordance with the illustrations of FIGS. 3*a* and 3*b*, i.e. the screw 20 has a portion 21 with a reduced diameter. In this region, the two half-shells 24*a* and 24*b* can be arranged on the screw 20.

Figure 6:
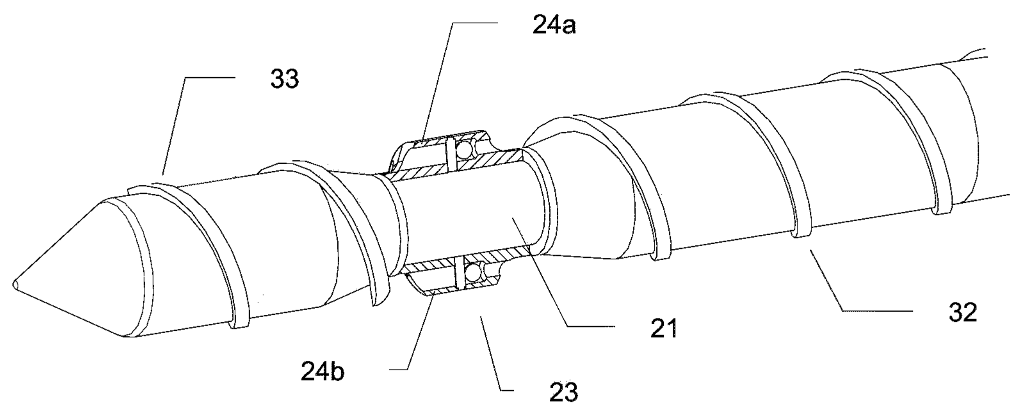
FIG. 6 second embodiment of a screw with a nonreturn valve according to the invention.

FIG. 6 shows a screw 20 according to a second embodiment of the invention. The nonreturn valve 23 does not necessarily have to sit at the front end of the screw, but rather can also be arranged further upstream. In this variant, one or more screw flights 32 are situated upstream of the nonreturn valve 23, and one or more screw flights 33 are situated downstream of the nonreturn valve 23, so that as seen in the direction of flow of the melt, after the nonreturn valve 23 a further conveying and homogenising of the plastic melt takes place. The precise number and the respective course of the screw flights 32, 33 on both sides of the nonreturn valve 23 depends on the case of application. In the embodiment according to FIG. 6, a screw flight 32 is provided upstream of the nonreturn valve 23, and a screw flight 33 is provided downstream of the nonreturn valve 23. The nonreturn valve 23 corresponds to the embodiment as has been described in further detail in connection with FIGS. 3*a*, 3*b*, 4*a* and 4*b*. In contrast to FIGS. 3*a*, 5*a* and 5*b*, the region 21 with reduced screw diameter and therefore the position of the nonreturn valve 23 is spaced apart further from the front end of the screw 20. The precise distance and therefore the position of the nonreturn valve 23 on the screw 20 conform to the respective case of application. Viewed in longitudinal direction of the screw 20, the nonreturn valve 23 can be arranged more or less distant from the front end of the screw 20.

LIST OF REFERENCE NUMBERS

1 screw cylinder
2 cylinder head
3 screw
4 heating bands
5 granulate hopper
5 nonreturn valve according to the prior art
7 screw head
8 pressure ring
9 blocking ring
10 thread
11 wing
20 screw
21 portion with reduced diameter
22 screw tip
23 nonreturn valve according to the invention
24*a* first half-shell
24*b* second half-shell
25 channel
26 ball
27 cylinder pin
28*a* channel portion with diameter smaller than ball diameter
28*b* channel portion with diameter greater than ball diameter

29 conical ball sealing seat
30 anti-rotation means
31 separation joint
32 screw flight upstream
33 screw flight downstream

What is claimed is:

1. A nonreturn valve for a screw of a plasticising unit of an injection-moulding machine, the nonreturn valve comprising:

two half-shells configured to be arranged in a portion of the screw having a reduced screw diameter, each of the two half-shells comprising one or more channels for melt to flow through from the screw into the space in front of the screw, wherein each of the one or more channels lies substantially parallel to a longitudinal axis of the nonreturn valve or respectively to a longitudinal axis of the screw, a ball and a pin located within each of the one or more channels of the half-shells, wherein the pin is arranged after the ball relative to the direction of flow of the melt, and the pin is further arranged substantially transversely to the direction of flow of the melt, wherein each pin in its respective channel is arranged radially relative to the longitudinal axis of the screw, and a distal end of each pin extends to an exterior of its respective half-shell, each of the one or more channels of the half-shells having a first channel portion and a second channel portion, the first channel portion being positioned before the second channel portion relative to the direction of flow of the melt, and the ball and pin being arranged in the second channel portion, wherein the first channel portion has a channel diameter smaller than a diameter of the ball, wherein the second channel portion has a channel diameter greater than the diameter of the ball, and wherein a length of the pin is greater than the channel diameter of the second channel portion.

2. The nonreturn valve according to claim 1, wherein a conically configured transition is provided from the first channel portion to the second channel portion.

3. The nonreturn valve according to claim 1, wherein the pin has a cylindrical cross-section or respectively is configured as a cylinder pin.

4. The nonreturn valve according to claim 1, wherein the half-shells are configured in such a way that an external diameter of the joined-together half-shells, measured parallel and perpendicularly to a separation joint therebetween is of equal size, in such a way that in the joined-together state a separation gap width of zero results.

5. A screw of a plasticising unit of an injection-moulding machine according to claim 1, wherein the screw has a portion in which no screw flight is present and in which an external diameter of the screw corresponds to an internal diameter of the nonreturn valve, and wherein the two half-shells of the nonreturn valve are arranged in said portion on the screw.

6. The screw according to claim 5, wherein the nonreturn valve, as seen in the flow direction of the melt, is arranged at a front end of the screw.

7. The screw according to claim 5, wherein the nonreturn valve is arranged spaced apart from a front end of the screw in such a way that, as seen in the flow direction of the melt, both in front of and also behind the nonreturn valve a screw portion is present with a screw flight.

8. The screw according to claim 5, wherein one or both of the half-shells are arranged by means of an anti-rotation means on the screw.

9. The screw according to claim 8, wherein the anti-rotation means is embodied in the form of one or more keys.

10. A plasticising unit of an injection-moulding machine with a screw, able to be driven rotatably and linearly, according to claim 5.

11. The screw according to claim 6, wherein the nonreturn valve, as seen in the flow direction of the melt, is arranged adjacent to a front end of the screw.

* * * * *